(12) United States Patent
Minami et al.

(10) Patent No.: US 7,251,645 B1
(45) Date of Patent: Jul. 31, 2007

(54) DATA PROCESSING APPARATUS, DATA PROCESSING SYSTEM, DATA PROCESSING METHOD, AND RECORDING MEDIUM

(75) Inventors: Etsuro Minami, Tokyo (JP); Tetsu Tatsumi, Tokyo (JP)

(73) Assignee: NS Solutions Corporation (JP)

(*) Notice: Subject to any disclaimer, the term of this patent is extended or adjusted under 35 U.S.C. 154(b) by 0 days.

(21) Appl. No.: 09/543,358

(22) Filed: Apr. 5, 2000

(30) Foreign Application Priority Data

Apr. 7, 1999 (JP) ................................. 11-99929

(51) Int. Cl.
*G06F 17/30* (2006.01)

(52) U.S. Cl. ............... 707/2; 707/8; 707/9; 707/10; 707/104.1

(58) Field of Classification Search ............ 707/2, 707/9, 10, 8, 104.1
See application file for complete search history.

(56) References Cited

U.S. PATENT DOCUMENTS 5,317,729 A * 5/1994 Mukherjee et al. ............ 707/3
5,742,813 A * 4/1998 Kavanagh et al. ............. 707/8
5,905,984 A * 5/1999 Thorsen .......................... 707/9
5,933,825 A * 8/1999 McClaughry et al. ......... 707/8

FOREIGN PATENT DOCUMENTS

| JP | 05-265838 | 10/1993 |
| JP | 05265837 | 10/1993 |
| JP | 06083866 | 3/1994 |

OTHER PUBLICATIONS

Moriya et al., "The Whole Picture of SF Project of IBM", Business Communication, Oct. 1997, vol. 34. No. 10, pp. 18-56.

* cited by examiner

*Primary Examiner*—Hung Pham
(74) *Attorney, Agent, or Firm*—Connolly Bove Lodge & Hutz LLP (57) ABSTRACT

A connection manager 112 manages, for each client, a set of object data (contexts #0, #1, #2, . . . ) subjected to arbitrary processing executed by clients C1, C2, C3, . . . . An entity manager 111 manages, for each context, the relationship between object data constituting the context and entities corresponding to the object data, and the parentage (context tree) between contexts.

12 Claims, 13 Drawing Sheets

| CLIENT | CONTEXT | OBJECT | | |
|---|---|---|---|---|
| | | OBJECT A | OBJECT B | OBJECT C |
| | #0(INITIAL) | a0 | b0 | c0 |

FIG. 8

| CLIENT | CONTEXT | OBJECT | | |
|---|---|---|---|---|
| | | OBJECT A | OBJECT B | OBJECT C |
| | #0(INITIAL) | a0 | b0 | c0 |
| C1 | #1 | | | |

FIG. 9

| CLIENT | CONTEXT | OBJECT | | |
|---|---|---|---|---|
| | | OBJECT A | OBJECT B | OBJECT C |
| | #0(INITIAL) | a0 | b0 | c0 |
| C1 | #1 | a1 | | |
| C2 | #2 | | | |

FIG. 10

| CLIENT | CONTEXT | OBJECT | | |
|---|---|---|---|---|
| | | OBJECT A | OBJECT B | OBJECT C |
| | #0(INITIAL) | a0 | b0 | c0 |
| C1 | #1 | a1 | | |
| C2 | #2 | | b2 | |
| | #3 | | | |
| | #4 | a4 | b4 | c4 |
| | #5 | a5 | b5 | c5 |

FIG. 11

| CLIENT | CONTEXT | OBJECT | | |
|---|---|---|---|---|
| | | OBJECT A | OBJECT B | OBJECT C |
| | #0(INITIAL) | a0 | b0 | c0 |
| C1 | #1 | a1 | | |
| C2 | #2 | | b2 | |
| | #3 | | | |
| | #4 | a4 | b4 | |
| | #5 | a5 | b5 | c5 |

FIG. 12

| CLIENT | CONTEXT | OBJECT | | |
|---|---|---|---|---|
| | | OBJECT A | OBJECT B | OBJECT C |
| | #0 (INITIAL) | a0 | b0 | c0 |
| C1 | #1 | a1 | | |
| | #2 | | b2 | |
| | #3 | | | |
| C2 | #4 | a4 | b4 | |
| C3 | #5 | | | c5 |
| | #6 | | | |
| | #7 | | | |

PARENT ENTITY(#0, C)
PARENT ENTITY(#1, C)
ENTITY(#2, C)

FIG. 13

| CLIENT | CONTEXT | OBJECT | | |
|---|---|---|---|---|
| | | OBJECT A | OBJECT B | OBJECT C |
| | #0(INITIAL) | a0 | b0 | c0 |
| C1 | #1 | a1 | | |
| | #2 | | b2 | c2 |
| | #3 | | | |
| C2 | #4 | a4 | b4 | |
| | #5 | | | c5 |
| C3 | #6 | | | |
| | #7 | | | |

PARENT ENTITY(#0, C)
ENTITY(#2, C)

FIG. 14

| CLIENT | CONTEXT | OBJECT | | |
|---|---|---|---|---|
| | | OBJECT A | OBJECT B | OBJECT C |
| | #0(INITIAL) | a0 | b0 | c0 |
| C1 | #1 | (#1, A) a1 | | |
| | #2 | | b2 | |
| C2 | #3 | | | |
| | #4 | (#4, A) a4 | b4 | |
| C3 | #5 | | | c5 |
| | #6 | | | |
| | #7 | | | |
| | | | | |

FIG. 15

| CLIENT | CONTEXT | OBJECT | | |
|---|---|---|---|---|
| | | OBJECT A | OBJECT B | OBJECT C |
| | #0(INITIAL) | a0 | b0 | c0 |
| C1 | #1 | a1 | | |
| | #2 | | b2 | |
| C2 | #3 | | | |
| | #4 | a4 | (#4, B)<br>b4 | |
| C3 | #5 | | | c5 |
| | #6 | | | |
| | #7 | | | |
| | | | | |

FIG. 16

| CLIENT | CONTEXT |
|---|---|
| C1 | #1 |
| C2 | #3 |
| ⋮ | ⋮ |

| CONTEXT | PARENT CONTEXT | OBJECT | | | |
|---|---|---|---|---|---|
| | | A | B | C | ⋯ |
| #0 | ·· | a0 | b0 | c0 | |
| #1 | #0 | a1 | | | |
| #2 | #1 | | b2 | | |
| #3 | #0 | a3 | b3 | | |
| ⋮ | ⋮ | | | | |

DATA PROCESSING APPARATUS, DATA PROCESSING SYSTEM, DATA PROCESSING METHOD, AND RECORDING MEDIUM

BACKGROUND OF THE INVENTION

1. Field of the Invention

The present invention relates to data processing apparatus, data processing systems, and data processing methods used for trial-and-error calculation, simulation calculation during data write, and the like, and recording media storing processing steps for executing such calculation so as to allow a computer to read out them.

2. Description of the Related Art

Conventionally, trial-and-error calculation, simulation calculation during data write, and the like are often adopted for risk evaluation processing of the financial business and market in the business fields and for simulations and planning of the circulation, physical distribution, and process control in the industrial fields.

However, when many clients (users) execute such calculation and simulation using data in a database (DB) whose data are frequently written (in this case, process control or the like is simulated for descriptive convenience), one client uses data while the remaining clients cannot use them, in order to ensure data consistency in the DB.

Figure 1:
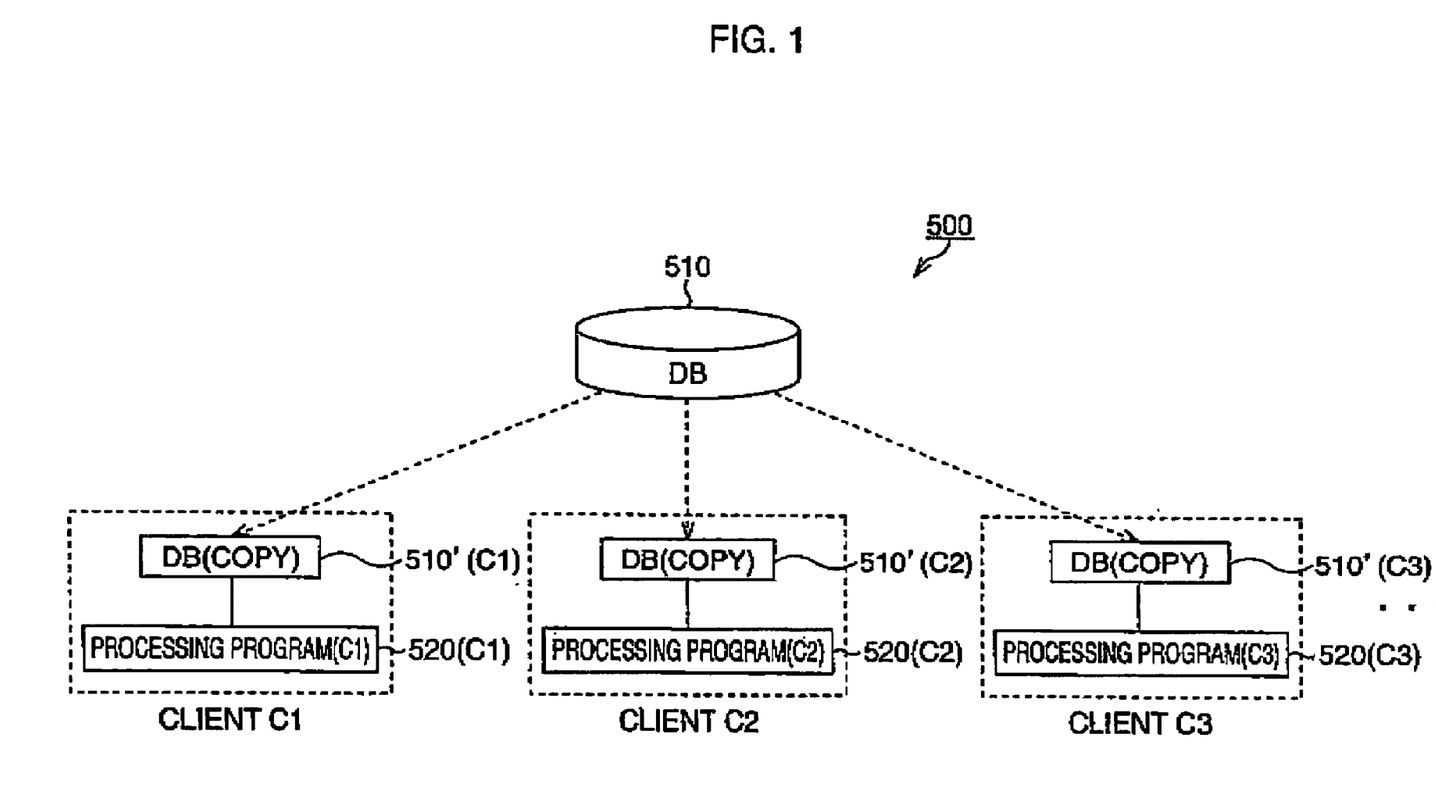
FIG. 1 is a block diagram showing the first construction example of a conventional data processing system.

To solve this problem, a data processing system 500 shown in FIG. 1 has been proposed.

In this data processing system 500, as shown in FIG. 1, copies (DB copies) 510' (C1), 510' (C2), 510' (C3), ... of data in a DB 510' are respectively set for clients C1, C2, C3, ... who perform simulations. Also, processing programs (simulation programs) 520 (C1), 520 (C2), 520 (C3), ... for performing simulations are respectively set in accordance with the DB copies 510' (C1), 510' (C2), 510' (C3). ...

This construction enables the clients C1, C2, C3, ... freely to perform simulations using their own DB copies regardless of whether the remaining clients are performing simulations. This construction also enables performing various simulations in parallel with each other.

However, in the data processing system 500 of FIG. 1, not only the DB copies 510' (C1), 510' (C2), 510' (C3), ... of the DB 510 but also the processing programs 520 (C1), 520 (C2), 520 (C3), ... are respectively set for the clients C1, C2, and C3 who perform simulations. This construction requires many memories, which complicates the system configuration and makes its management and maintenance difficult.

Since the clients C1, C2, C3, ... perform simulations using their own DB copies, simulations may be done with different data contents.

Assume that the client C1 completes simulations, and writes the contents of the original DB 510 using the simulation results in order to inform the remaining clients of the results. At this time, the clients C2, C3, ... execute simulations using their own DB copies 510' (C2), 510' (C3), ..., i.e., the contents of the DB 510 before write.

Figure 2:
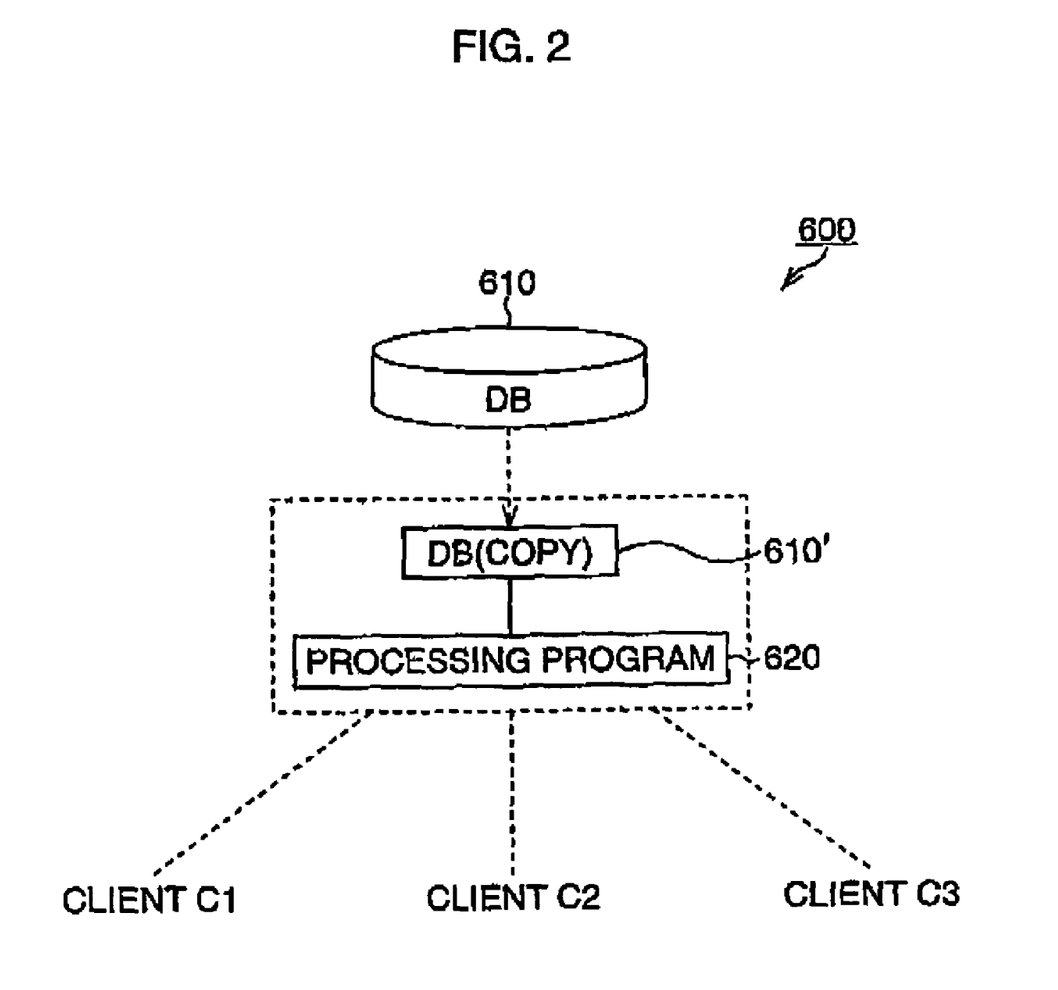
FIG. 2 is a block diagram showing the second construction example of the conventional data processing system.

To solve this problem in the data processing system 500 of FIG. 1, a data processing system 600 shown in FIG. 2 has been proposed.

As shown in FIG. 2, the data processing system 600 comprises one copy (DB copy) 610' of data in a DB 610, and one processing program (simulation program) 620 for performing simulations. Clients C1, C2, C3, ... share the DB copy 610' to execute simulations.

This construction enables the clients C1, C2, C3, ... to perform simulations with the same data contents without requiring many memories.

However, some of clients who perform simulations may want to execute simulations with data contents before write.

In this case, the data processing system 500 in FIG. 1 is convenient for a client who wants to perform simulations with data contents before write because even if the contents of the original DB 510 are written by the simulation results of the client C1, the contents of the DB copies 510' (C2), 510' (C3), ... of the clients C2, C3, ... are not written.

To the contrary, the data processing system 600 in FIG. 2 is inconvenient for a client who wants to perform simulations with data contents before write because if the contents of the copy DB 610' are written by the simulation results of the client C1, the clients C2, C3, ... can perform simulations using only the written copy DB 610'.

In other words, clients who perform simulations include various clients: a client who wants to perform simulations with data contents before write (data contents which do not reflect the simulation results of another client), a client who wants to perform simulations with written data contents (data contents which reflect the simulation results of another client), and a client who wants to switch these simulations in accordance with the situation. However, no conventional system can realize a simulation that satisfies the requirements of all clients with a simple construction.

SUMMARY OF THE INVENTION

The present invention has been made to overcome the conventional drawbacks, and aims to provide data processing apparatus, data processing systems, and data processing methods capable of efficiently realizing, with a simple construction, trial-and-error calculation, simulation calculation during data write, and the like that satisfy the requirements of all clients, and recording media storing processing steps for executing such calculation so as to allow a computer to read out them.

According to the present invention, a data processing apparatus for allowing clients to access units of object data to execute arbitrary processing is characterized by comprising first management means for managing a set of object data subjected to the arbitrary processing for each client, second management means for managing object data included in the set and entities corresponding to the object data for each set of object data, third management means for managing parentage within the set of object data for each client, and access means for acquiring an entity corresponding to a client that has issued an access request from management information by the first, second, and third management means, and performing the access processing to the entity.

According to another aspect of the present invention, a data processing apparatus is characterized by further comprising generation means for generating the set of object data for a client on the basis of a request from the client.

According to still another aspect of the present invention, a data processing apparatus is characterized in that when an entity subjected to the access processing does not exist, the access means acquires a parent entity of the subjected entity from the management information by the third management means, and performs the access processing to the entity.

According to still another aspect of the present invention, a data processing apparatus is characterized by further comprising copying means for performing copying processing of an entity corresponding to the object data between sets of object data.

According to still another aspect of the present invention, a data processing apparatus is characterized by further comprising switching means for switching sets of object data.

According to still another aspect of the present invention, a data processing apparatus is characterized in that the third management means manages whether an entity corresponding to the object data reflects a result of access to a parent entity.

According to the present invention, a data processing system capable of connecting clients and a memory storing units of object data via a data processing apparatus for allowing the clients to execute arbitrary processing using data in the memory is characterized in that the data processing apparatus comprises first management means for managing a set of object data subjected to the arbitrary processing for each client, second management means for managing object data included in the set and entities corresponding to the object data for each set of object data, third management means for managing parentage within the set of object data for each client, and access means for acquiring an entity corresponding to a client that has issued an access request from management information by the first, second, and third management means, and performing the access processing to the entity.

According to the present invention, a data processing method for allowing clients to execute arbitrary processing using units of object data is characterized by comprising the first management step of managing a set of object data subjected to the arbitrary processing for each client, the second management step of managing object data included in the set and entities corresponding to the object data for each set of object data, the third management step of managing parentage within the set of object data for each client, and the access step of acquiring an entity corresponding to a client that has issued an access request from management information in the first, second, and third management steps, and performing access processing to the entity.

According to another aspect of the present invention, a data processing method is characterized by further comprising the generation step of generating the set of object data based on a request from the client.

According to still another aspect of the present invention, a data processing method is characterized in that the access step comprises the step of determining whether an entity subjected to the access processing exists, acquiring, based on the determination result, a parent entity of the subjected entity from the management information in the third management step, and performing the access processing to the entity.

According to still another aspect of the present invention, a data processing method is characterized by further comprising the copying step of performing copying processing of an entity corresponding to the object data between sets of object data.

According to still another aspect of the present invention, a data processing method is characterized by further comprising the switching step of switching sets of object data.

According to still another aspect of the present invention, a data processing method is characterized in that the third management step comprises the step of managing whether an entity corresponding to the object data reflects a result of access to a parent entity.

According to the present invention, a recording medium which stores processing steps of a data processing method for allowing clients to execute arbitrary processing using units of object data so as to allow a computer to read out the processing steps is characterized in that the processing steps includes the first management step of managing a set of object data subjected to the arbitrary processing for each client, the second management step of managing object data included in the set and entities corresponding to the object data for each set of object data, the third management step of managing parentage within the set of object data for each client, and the access step of acquiring an entity corresponding to a client that has issued an access request from management information in the first, second, and third management steps, and performing the access processing to the entity.

DETAILED DESCRIPTION OF THE PREFERRED EMBODIMENTS

A preferred embodiment of the present invention will be described below with reference to drawings.

Figure 3:
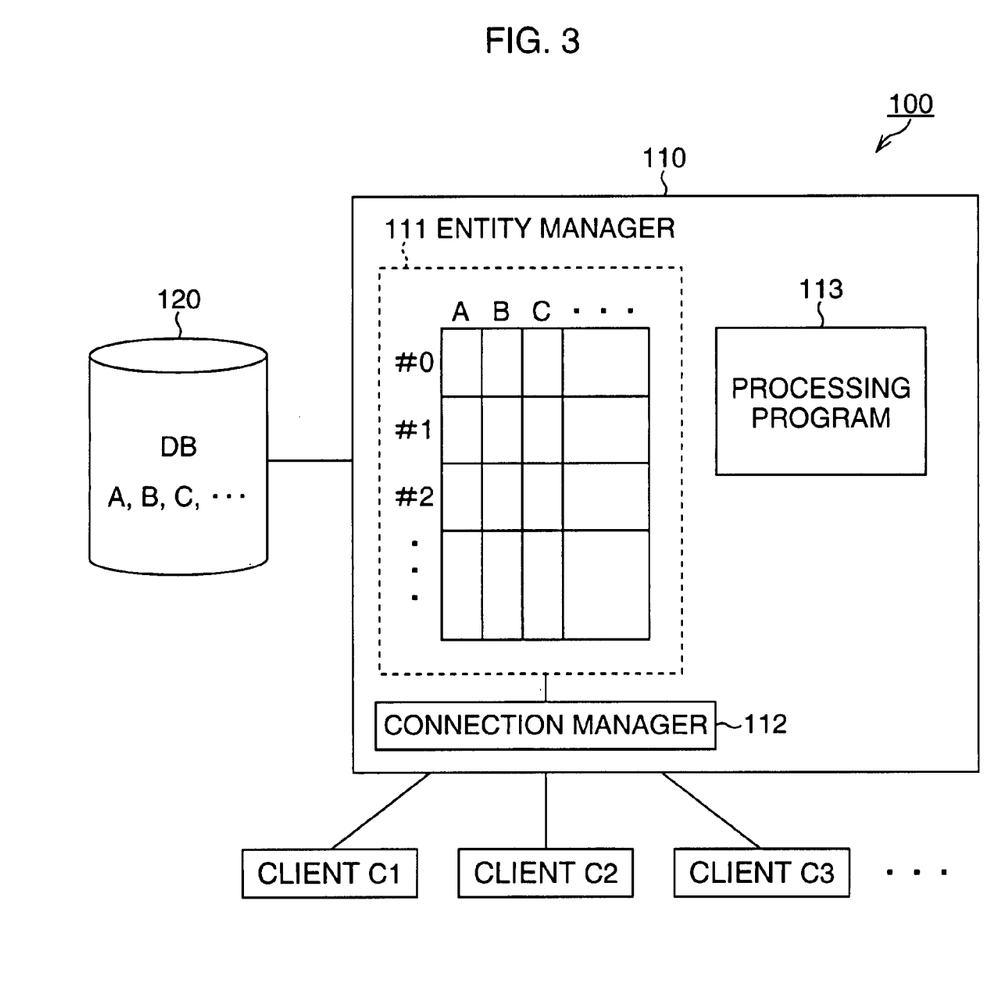
FIG. 3 is a block diagram showing the construction of a data processing system to which the present invention is applied.

The present invention applies to, e.g., a data processing system 100 shown in FIG. 3.

As shown in FIG. 3, the data processing system 100 allows clients C1, C2, C3, . . . to perform trial-and-error calculation, simulation calculation during data write, and the like using data in a database (DB) 120 (in this case, simulations are done for descriptive convenience).

Access to the DB 120 by the clients C1, C2, C3, . . . is managed by a data processing apparatus 110. That is, the clients C1, C2, C3, . . . access the DB 120 via the data processing apparatus 110.

The data processing apparatus 110 includes an entity manager 111, a connection manager 112, and a processing program (simulation program) 113. The data processing apparatus 110 generates a context (to be described later) based on a client who has issued a data access request from data (object data) in the DB 120, and manages the context.

This data processing apparatus 110 will be described below in detail.

The clients C1, C2, C3, . . . include all clients that access the DB 120, i.e., receive read/write services of object data in the DB 120 by the data processing apparatus 110. For example, the clients are terminal devices such as personal computers.

Figure 4:
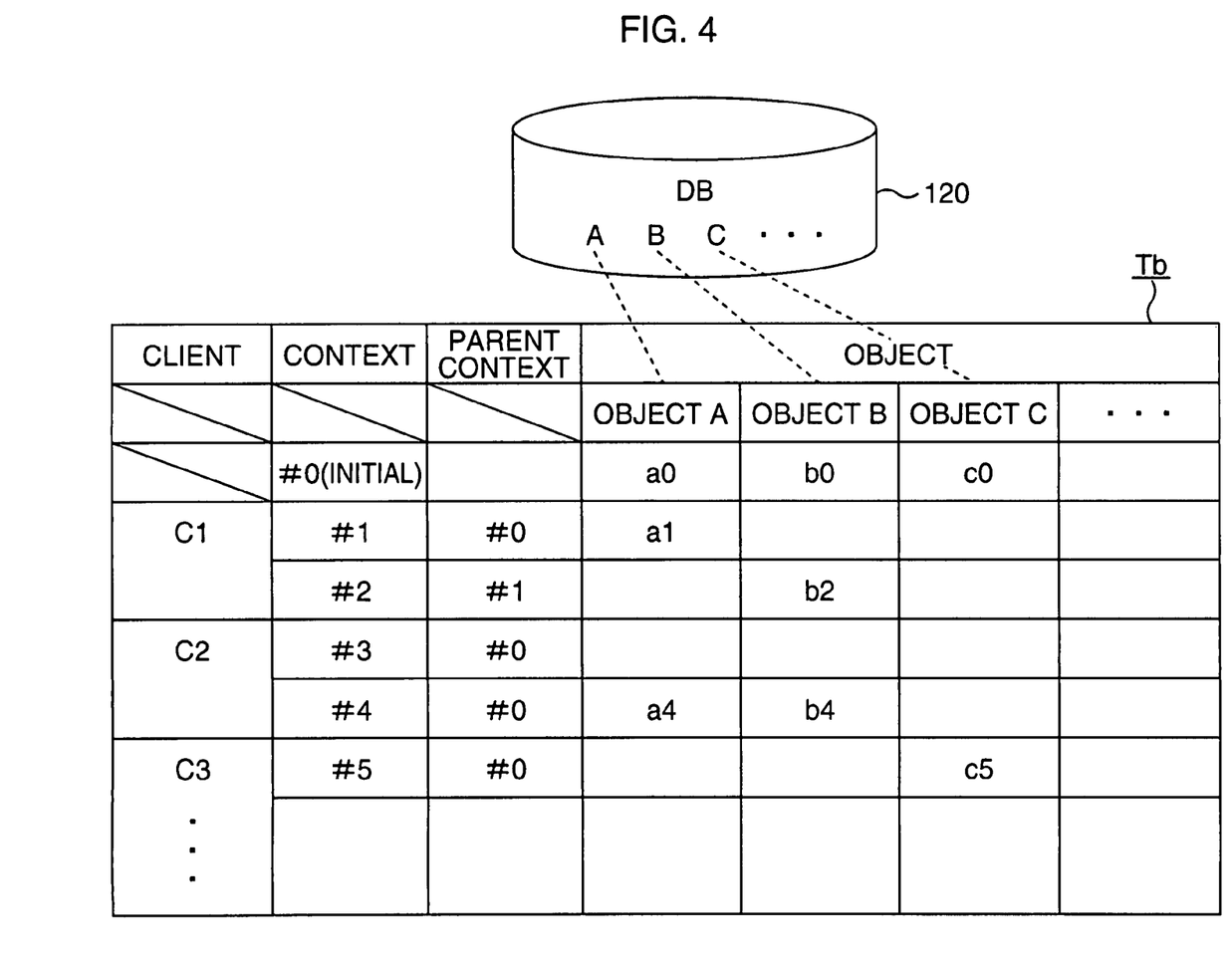
FIG. 4 is a view for explaining context management for each client in the data processing system.

As shown in FIG. 4, the DB 120 includes various object data A, B, C, . . . . A context based on a client that has issued an access request is generated from these object data A, B, C, . . . .

The "context" means a set of data according to given conditions. For example, when the client C1 is to execute a certain simulation, a set of object data subjected to the simulation ("world" made up of a set of object data for the client C1) is a context.

The connection manager 112 manages, for each client, the contexts of a client that issues a connection request for a simulation. The entity manager 111 manages, for each client, the relationship between a context, an object (to be described later), and an entity using a table "Tb" as shown in FIG. 4.

As will be described in detail later, context management for each client in the state Tb shown in FIG. 4, and simulation execution by the client will be roughly described. First, initial entities a0, b0, c0, . . . as copies of the object data A, B, C, . . . in the DB 120 are defined as a context #0 (initial context).

Then, a context #1 is generated upon reception of a request from the client C1. The client C1 performs a simulation with the context #1. In this simulation, e.g., the object data A is written for an entity a1 serving as a copy of the initial entity a0, and the object data B, C, . . . are read for the initial entities b0, c0, . . . serving as parents.

In generating a context, a specific parent context is designated. In this case, the context #1 is generated using the context #0 as a parent.

A context #2 is generated upon reception of a request that the client C1 wants to perform a new simulation in a different environment from that of the context #1. The client C1 can also perform a simulation with the context #2.

In this simulation, if the context #2 is generated using the context #1 as a parent, the object data A, C, . . . are read for the entities a1, c0, . . . , and the object data B is read and written for an entity b2 serving as a copy of the initial entity. If the context #2 is generated using the context #0 as a parent, the object data A, C, . . . are read for the initial entities a0, c0, . . . , and the object data B is read and written for the entity b2.

A context #3 is generated using the context #0 as a parent upon reception of a request from the client C2. The client C2 performs a simulation with the context #3. In this simulation, the object data A and B are read and written for entities a4 and b4 as copies of the initial entities a0 and b0, and the object data C, . . . are read for the initial entities c0, . . . serving as parents. At this time, the entity a1 (data written by the simulation using the context #1) and the entity b2 (data written by the simulation using the context #2) can also be read.

In this way, each client necessarily has one context the client reads at given time. Some of contexts are not read by any client. Further, two or more clients may read the same context.

Figure 5:
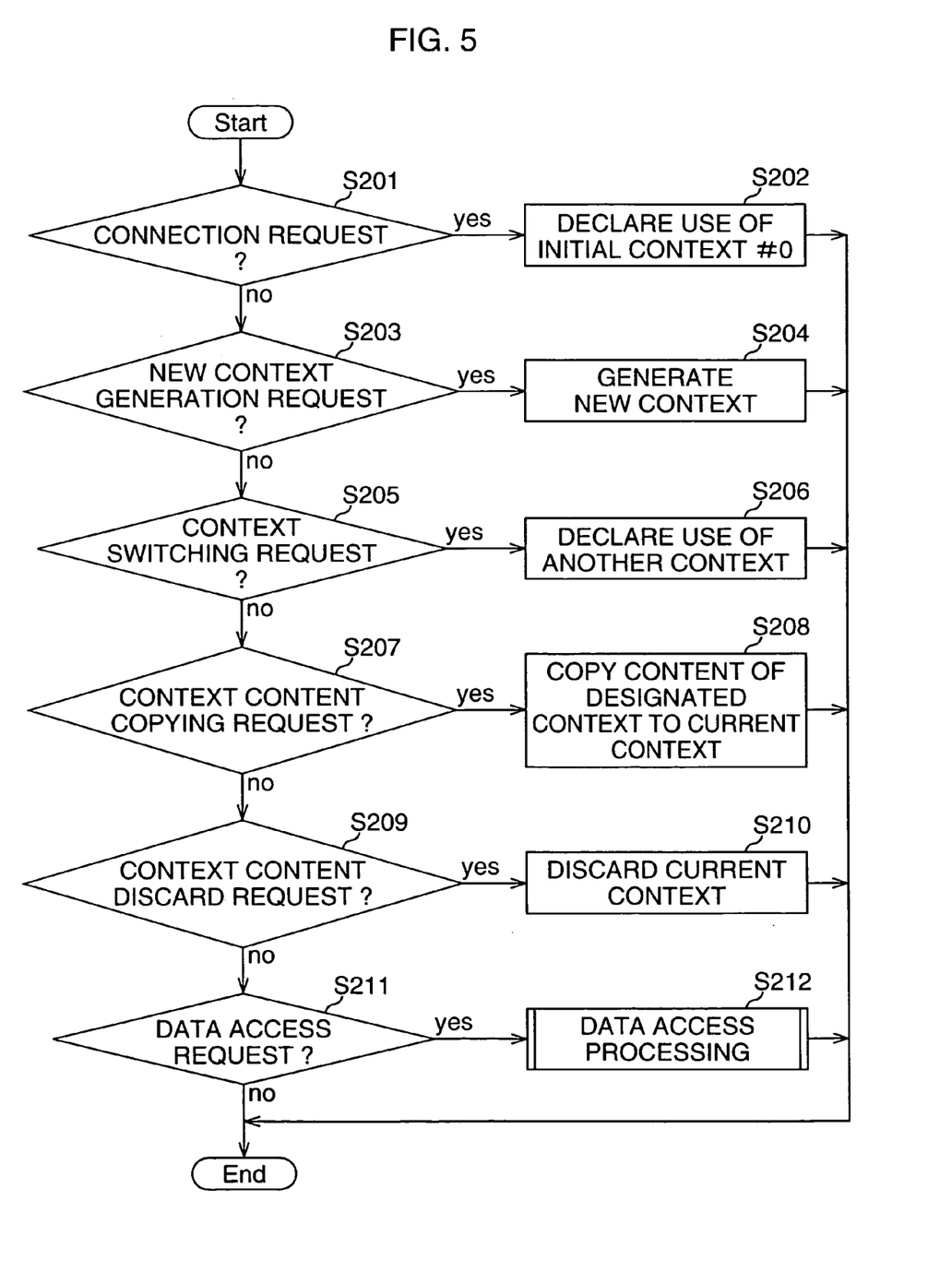
FIG. 5 is a flow chart for explaining main processing of the data processing system.
Figure 6:
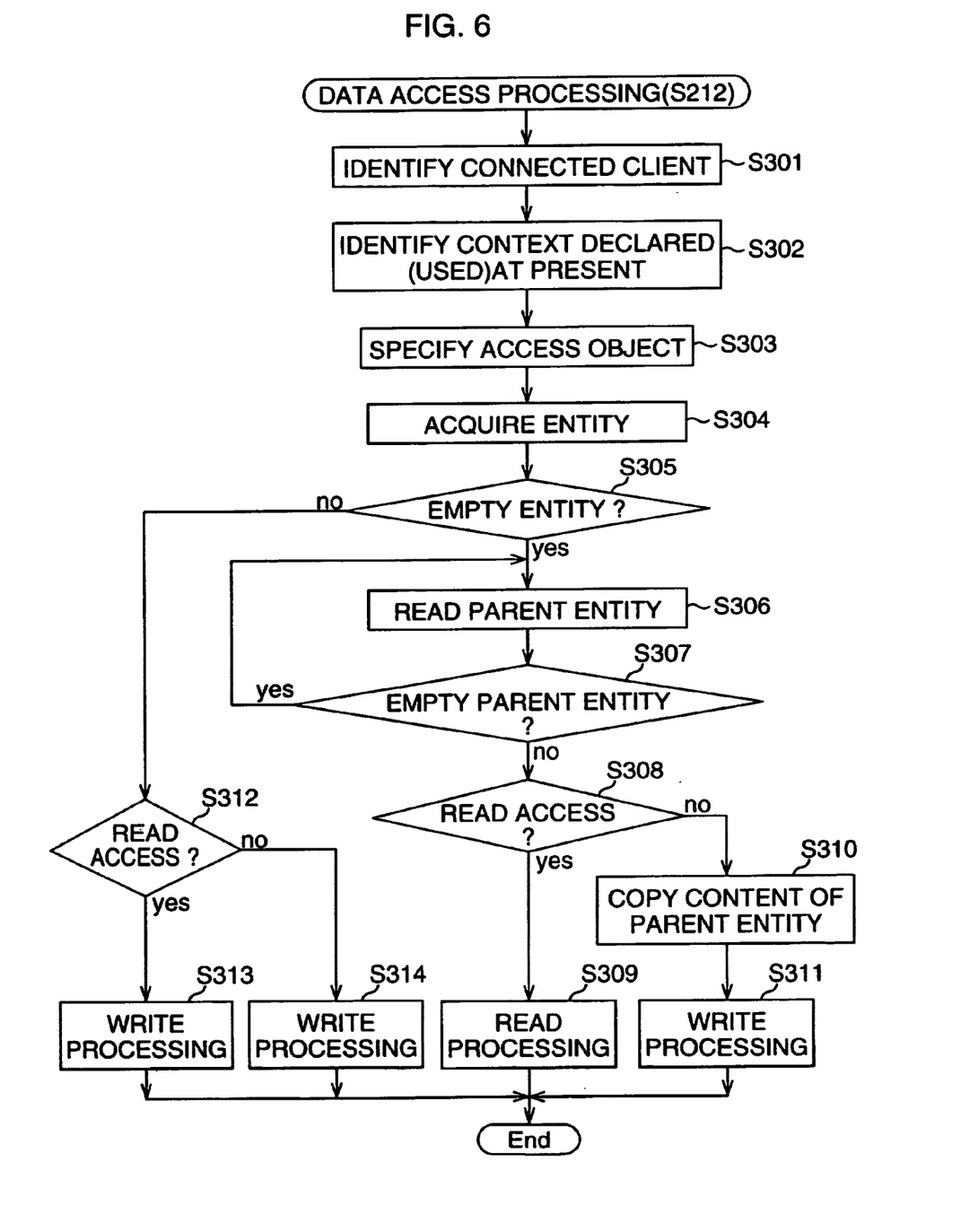
FIG. 6 is a flow chart for explaining data access processing of main processing.

Processing for generating and managing contexts for the clients C1, C2, C3, . . . is shown in the flow charts of FIGS. 5 and 6. The data management apparatus 110 repetitively executes the processing in FIGS. 5 and 6 to generate and manage contexts for the clients C1, C2, C3, . . . in the following manner.

For descriptive convenience, the DB 120 includes three units of object data A, B, and C. The three clients C1, C2, and C3 access the object data A, B, and C in the DB 120, respectively.

(1) Main Processing: See FIG. 5

Figure 7:
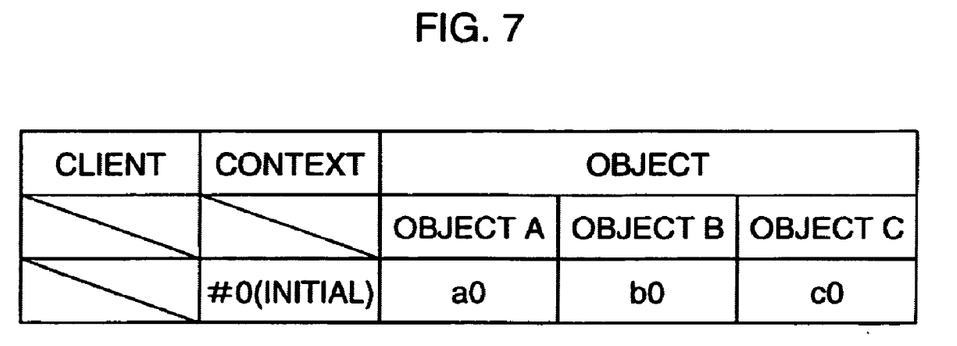
FIG. 7 is a table for explaining processing upon reception of a connection request in main processing.

Steps S201 and S202:

It is checked in an initial state (step S201) whether a request is a connection request from a client. If yes in step S201, an initial context #0 as a context made up of a set of entities a0, b0, and c0 as copies of the original object data A, B, and C is generated as shown in FIG. 7 (step S202). The processing then ends.

If no in step S201, the flow shifts to step S203.

For convenience, a description of the "parent context" column from FIG. 7 to FIG. 15 (to be described below) will be omitted.

Figure 8:
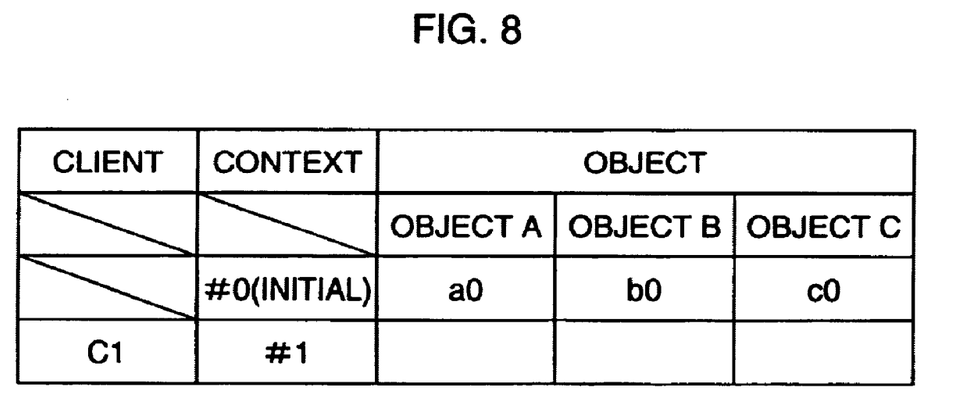
FIG. 8 is a table for explaining processing upon reception of a context generation request in main processing.

Steps S203 and S204:

It is checked whether the request is a context generation request from a client (step S203). If yes in step S203, e.g., the request is a new context generation request from the client C1 so as to execute, e.g., a new simulation, a context #1 is generated using the initial context #0 as a parent, as shown in FIG. 8 (step S204). At this time, a specific parent context is designated. The client C1 can execute a simulation while reading the entities a0, b0, and c0. Thereafter, the processing ends.

If no in step S203, the flow shifts to step S205.

Steps S205 and S206:

It is checked whether the request is a context switching request from a client (step S205). If yes in step S205, the current context of the requesting client is switched to a context represented by the request (step S206).

Figure 9:
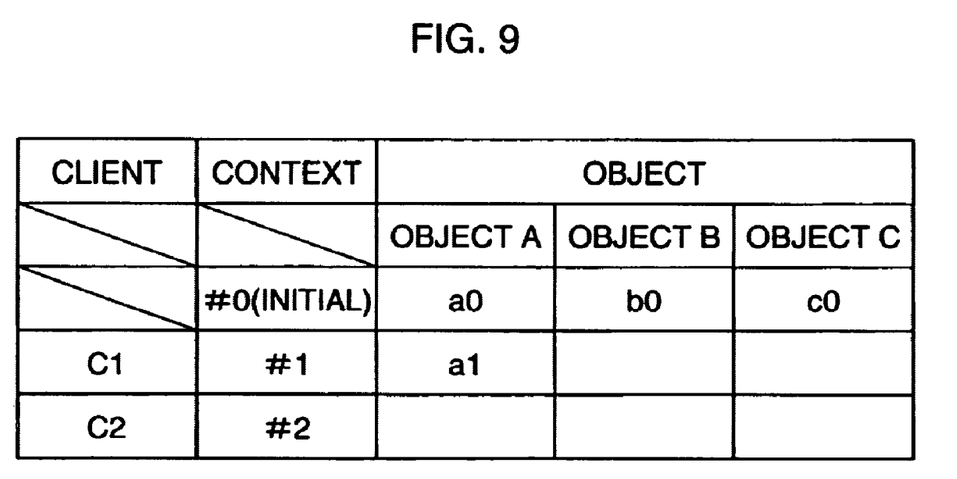
FIG. 9 is a table for explaining processing upon reception of a context switching request in main processing.

For example, if the client C2 executing a simulation with a context #2 issues a request of switching the context #2 to the context #1 of the client C1 executing a simulation with the context #1, as shown in FIG. 9, the context #2 is switched to the context #1. The client C2 can then execute a simulation in the same environment as that of the client C1. After the context is switched, the processing ends.

If no in step S205, the flow shifts to step S207.

Steps S207 and S208:

It is checked whether the request is a context copying request from a client (step S207). If yes in step S207, the contents of a context represented by the request are copied to the contents of the current context of the requesting client (step S208).

Figure 10:
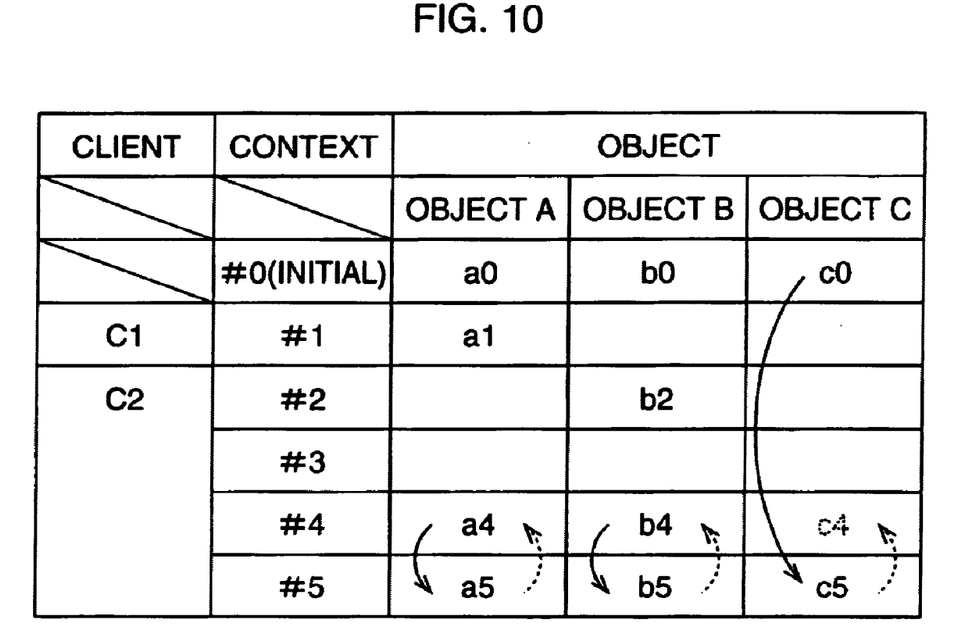
FIG. 10 is a table for explaining processing upon reception of a context copying request in main processing.

For example, when the client C2 that is to execute a simulation with a context #5 issues a request of copying the contents of a context #4, as shown in FIG. 10 (see solid arrows), a set including an entity a5 serving as a copy of the entity a4, an entity b5 serving as a copy of the entity b4, and an entity c5 serving as a copy of the initial entity c0 is defined as a context #5. Even if the entities a4 and b4 are written by a simulation with the context #4, the context #5 holds data contents before write. This allows executing a simulation with the context #5 regardless of the results of a simulation with the context #4. A simulation from an instantaneous state during a simulation with the context #4 can be executed in a different simulation form from that of a simulation with the context #5. After the contents of the context are copied, the processing ends.

If no in step S207, the flow shifts to step S209.

Processing for a context copying request in step S208 can also copy, e.g., the contents of the context #5 to the contents of the parent context #4, as shown in FIG. 10 (see dotted arrows). In this case, the entities a5 and b5 are copied to the entities a4 and b4, and the entity c5 is copied as an entity c4.

Steps S209 and S210:

It is checked whether the request is a context discard request from a client (step S209). If yes in step S209, the contents of a context designated by the request are discarded (step S210).

Figure 11:
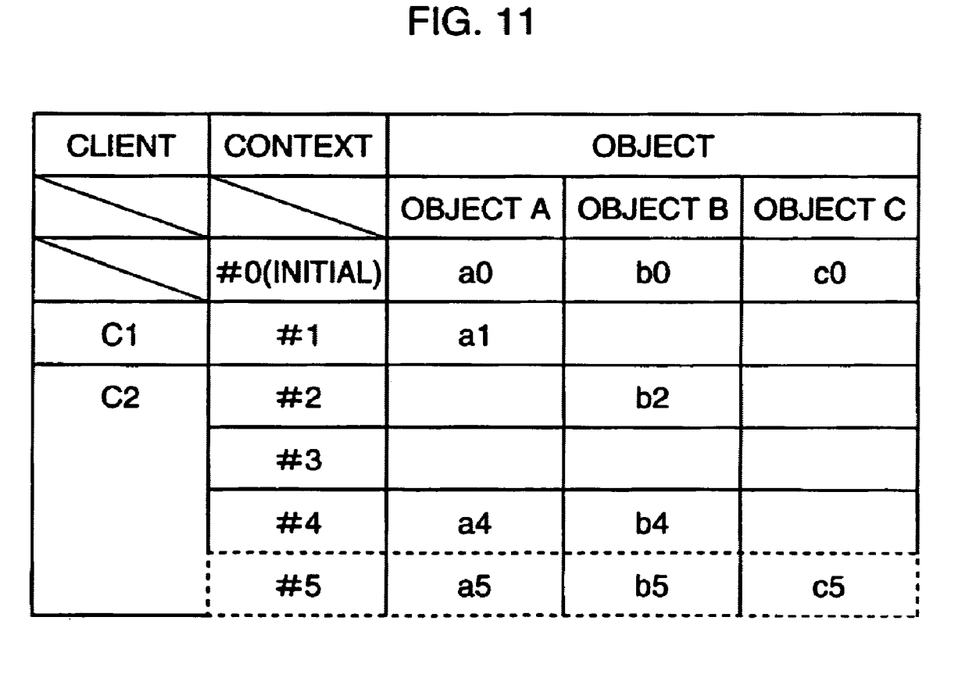
FIG. 11 is a table for explaining processing upon reception of a context discard request in main processing.

For example, when the client C2 issues a request of discarding the current context #5, as shown in FIG. 11, the entities a5, b5, and c5 are discarded. If a client reading the context #5 accesses the data A, and the parent of the context #5 is the context #1, the client reads the entity a1 of the parent context #1.

As another processing, the context itself can be discarded. In this case, the context #5 itself is discarded.

After the context is discarded, the processing ends.

If no in step S209, the flow shifts to step S211.

Steps S211 and S212:

It is checked whether the request is a data access request from a client (step S211). If yes in step S211, processing for data read/write (to be described in detail below) in a simulation executed by the requesting client is done (step S212). After that, the processing ends.

If no in step S211, the processing ends.

(2) Data Access Processing (Step S212): See FIG. 6

Step S301:

A client that issues a data access request is recognized.

Step S302:

The context (context in use) of the client recognized in step S301 is recognized.

Step S303:

Target data in the context recognized in step S302 (which unit of the object data A, B, and C is the target to be read or written) is recognized.

Figure 12:
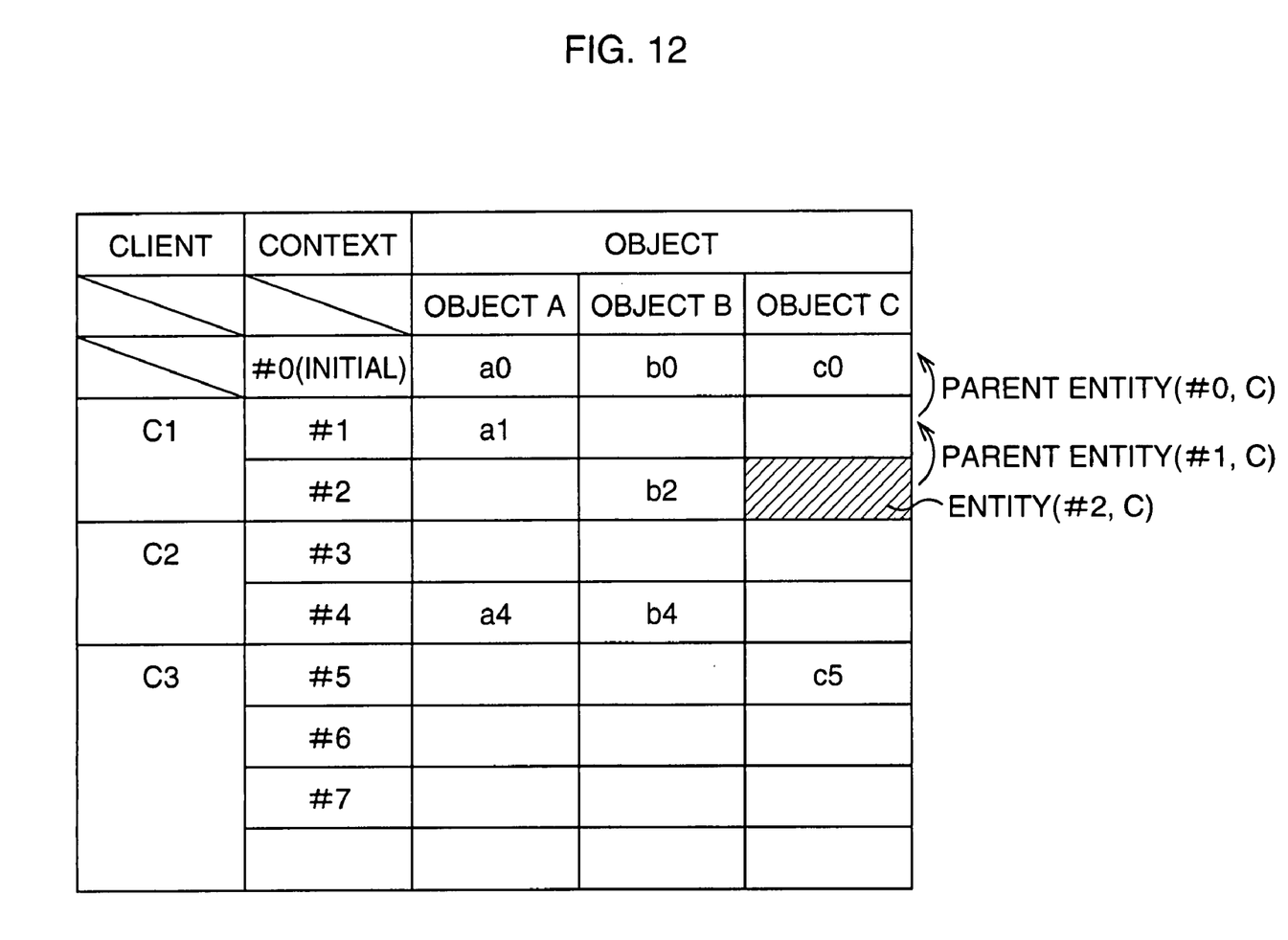
FIG. 12 is a table for explaining read processing to an empty entity in data access processing.

Step S304:

An entity corresponding to the target object data recognized in step S303 is acquired. The "entity" means a hatched portion (#2, C) when, for example, the client C1 is to read or write the object data C in a simulation with the context #2, as shown in FIG. 12. This entity is expressed as an "entity (context number #x, target object)".

Step S305:

Whether the entity acquired in step S304 is empty is checked. If yes in step S305, processing starting from step S306 is executed; or if no, processing starting from step S312 is executed.

Step S306:

For example, when the entity acquired in step S304 is an entity (#2, C) shown at the hatched portion in FIG. 12, the entity (#2, C) is empty, and thus a parent entity (#1, C) is read.

Step S307:

Whether the entity (#1, C) read in step S306 is empty is checked. Since the entity (#1, C) is empty in FIG. 12, the flow returns to step S306 to read a parent entity (#0, C). Since this entity (#0, C) is occupied (the entity c0 exists), the flow shifts to step S308 upon determination in step S307.

Step S308:

If no in step S307 (in this case, the entity (#0, C)), whether the contents of the data access request are "read" or "write" is checked.

Step S309:

If the request is determined in step S308 to be a read access request, the contents (=entity c0) of the entity (#0, C) read in step S306 are read out and supplied to the requesting client C1. Then, the processing ends.

Figure 13:
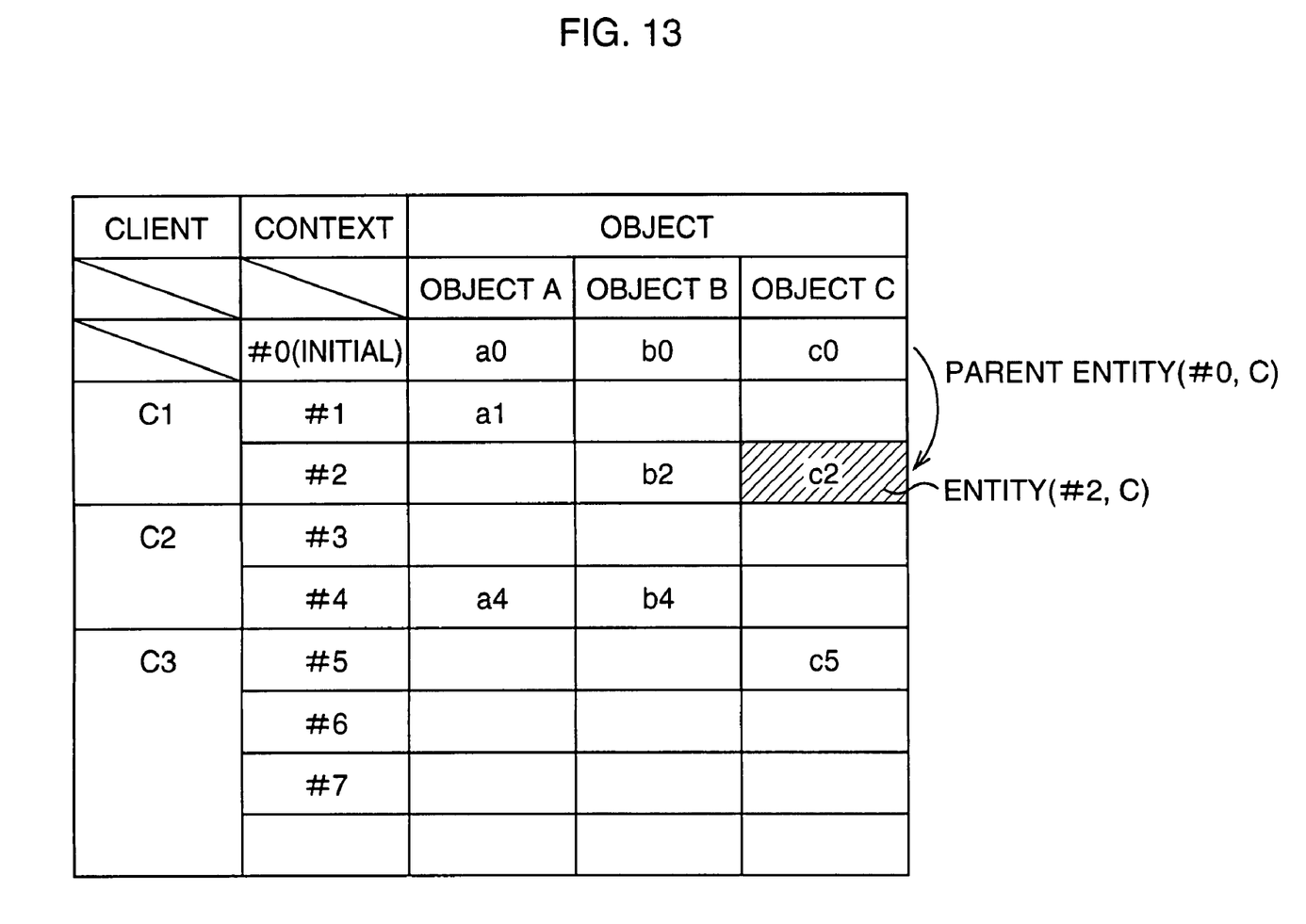
FIG. 13 is a table for explaining write processing to an empty entity in data access processing.

Step S310:

If the request is determined in step S308 to be a write access request, the contents (=entity c0) of the entity (#0, C) read in step S306 are copied to the entity acquired in step S304, as shown in FIG. 13.

Step S311:

Copy data generated in step S310 is to be written as an entity c2 in the context #2. Then, the processing ends.

Figure 14:
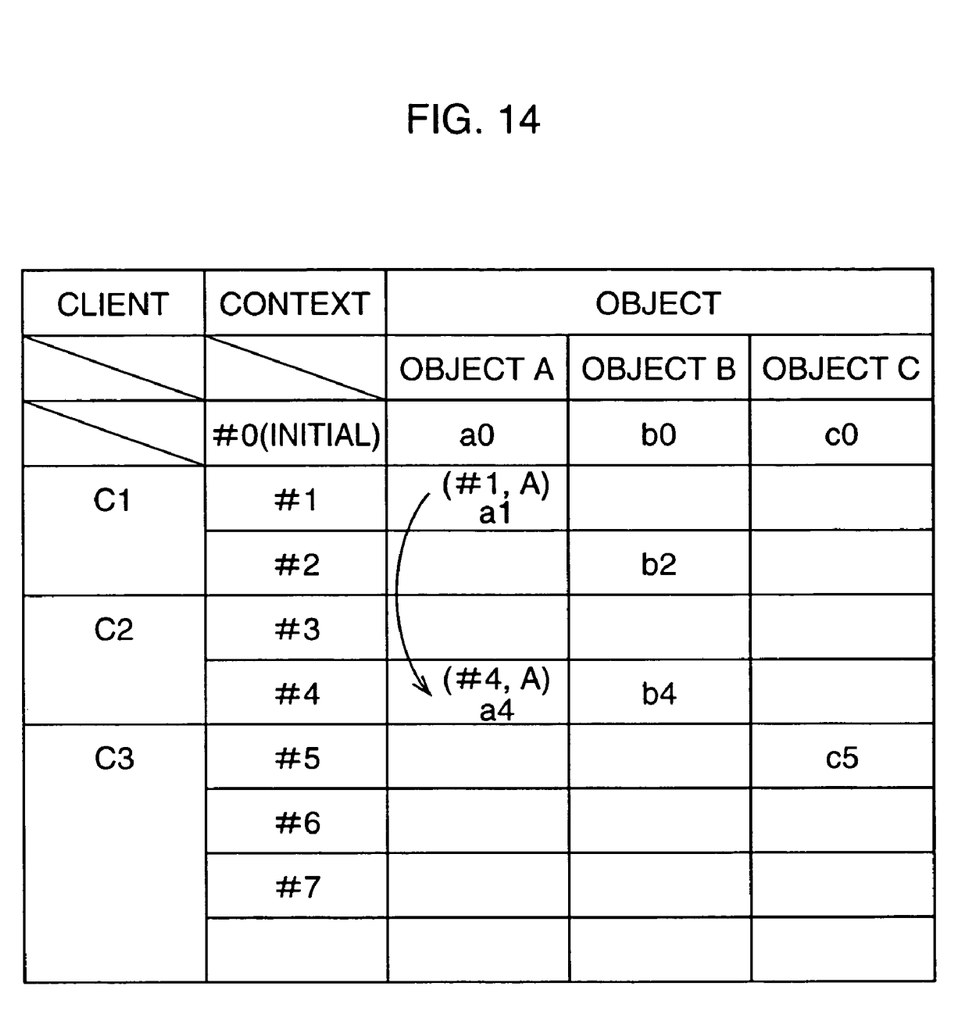
FIG. 14 is a table for explaining write processing in detail.

In steps S310 and S311, if the client C2 executes a simulation with the context #4 and issues a write request for the object data A (at this time, an entity (#4, A) is empty), as shown in FIG. 14, the contents of a parent entity (#1, A) are copied as an entity a4 to the entity (#4, A). At this time, if the client C1 issues a write request to the entity (#1, A) of the context #1, the contents of the entity (#1, A) are written in accordance with predetermined conditions (conditions such as whether the results of a simulation by the client C1 are reflected on another client), and copied to the entity (#4, A). Alternatively, the entity (#1, A) is copied to the entity (#4, A), and the contents of the entity (#1, A) are written.

More specifically, in writing the contents of a given entity (e.g., the entity (#1, A)), it is recognized whether a child entity (e.g., the entity (#4, A)) using this entity as a parent exists, and whether the child entity is in a mode (transparent mode) in which the child entity is influenced by write of the contents of the parent entity or in a mode (nontransparent mode) in which the child entity is not influenced by write of the contents of the parent entity. If the child entity is in the transparent mode, the contents of the parent entity are written; or if the child entity is in the nontransparent mode, the contents of the parent entity before write are copied to the child entity, and then the contents of the parent entity are written. Write of the contents of the child entity does not influence the contents of the parent entity.

As a result, each client can execute a simulation in either form: the client executes a simulation while being influenced by a simulation by another client, or executes a simulation not influenced by a simulation by another client.

Step S312:

If the entity acquired in step S304 is occupied, whether the request is a read or write access request is checked, similar to step S308.

Step S313:

If the request is determined in step S312 to be a read access request, the contents of the occupied entity acquired in step S304 are read out and supplied to the requesting client C1.

Figure 15:
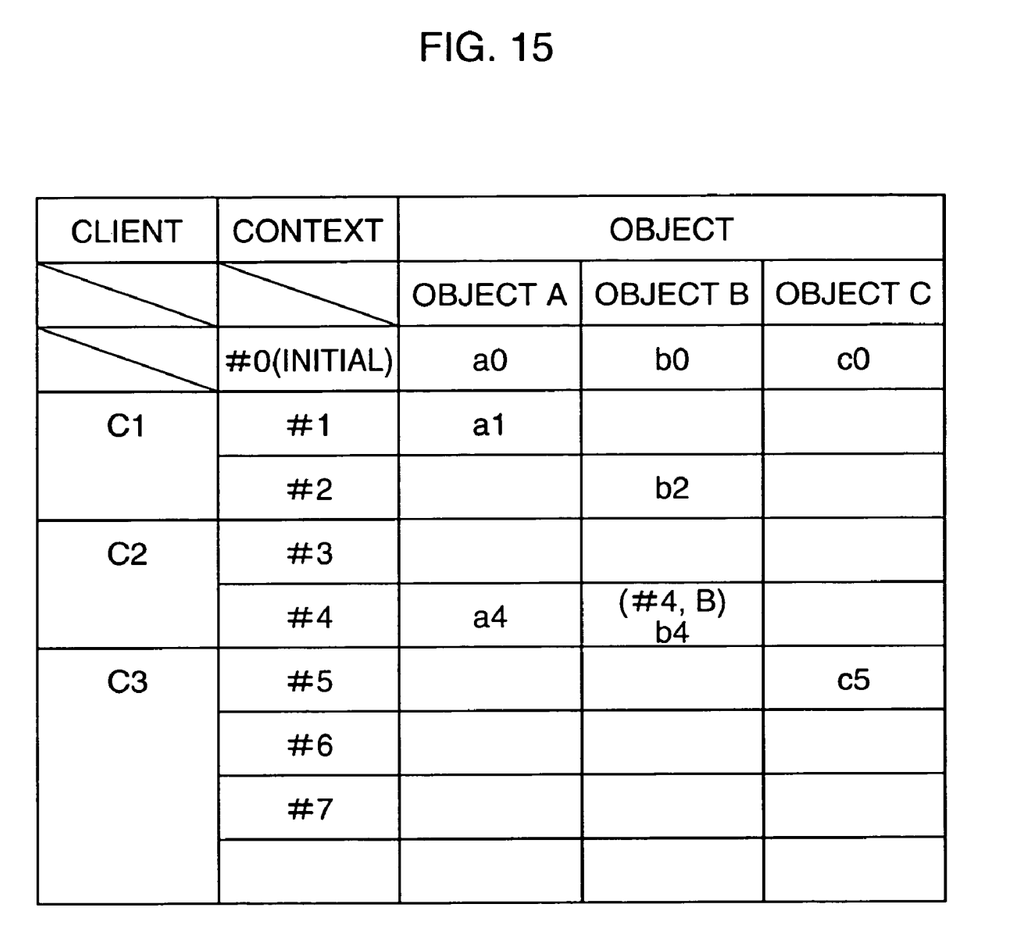
FIG. 15 is a table for explaining read processing and write processing to an occupied entity in data access processing.

For example, when the entity acquired in step S304 is an entity (#4, B) as shown in FIG. 15, the entity (#4, B) is occupied, and its contents (=entity b4) are read out.

After that, the processing ends.

Step S314:

If the request is determined in step S312 to be a write access request, the contents of the occupied entity acquired in step S304 are to be written.

For example, when the entity acquired in step S304 is the entity (#4, B), as shown in FIG. 15, its contents (=entity b4) are written. Similar to step S311, it is recognized whether a child entity using the entity (#4, B) as a parent exists, and whether the child entity is in the transparent or nontransparent mode. If the child entity is in the transparent mode, the contents of the entity (#4, B) are written; or if the child entity is in the nontransparent mode, the contents (=entity b4) of the entity (#4, B) before write are copied to the child entity, and the contents of the entity (#4, B) are written.

After that, the processing ends.

As described above, according to this embodiment, contexts used for simulations, the relationship between object data, entities, and contexts, and the tree relationship (parentage) between contexts are managed for each client. This allows executing simulations which simultaneously satisfy the requirements of various clients: a client who wants to perform simulations with data contents not reflecting the simulation results of another client, a client who wants to perform simulations with data contents reflecting the simulation results of another client, and a client who wants to switch these simulations in accordance with the situation. Respective clients can execute simulations in parallel with each other as if they accessed their own databases. By issuing a context switching request, a client can also execute a simulation coordinated with a simulation by another client.

A context in use is recognized for each client. When, for example, a given client wants to output simulation results (print output, display output, or the like), the client can output the simulation results only by designating output of them (inputting an output command or the like) without any consciousness of a context in use.

The data processing system 100 comprises one copy of the DB 120 used for simulations and one simulation program 113. Hence, the memory can be saved, and the system configuration can be simplified.

Figure 16:
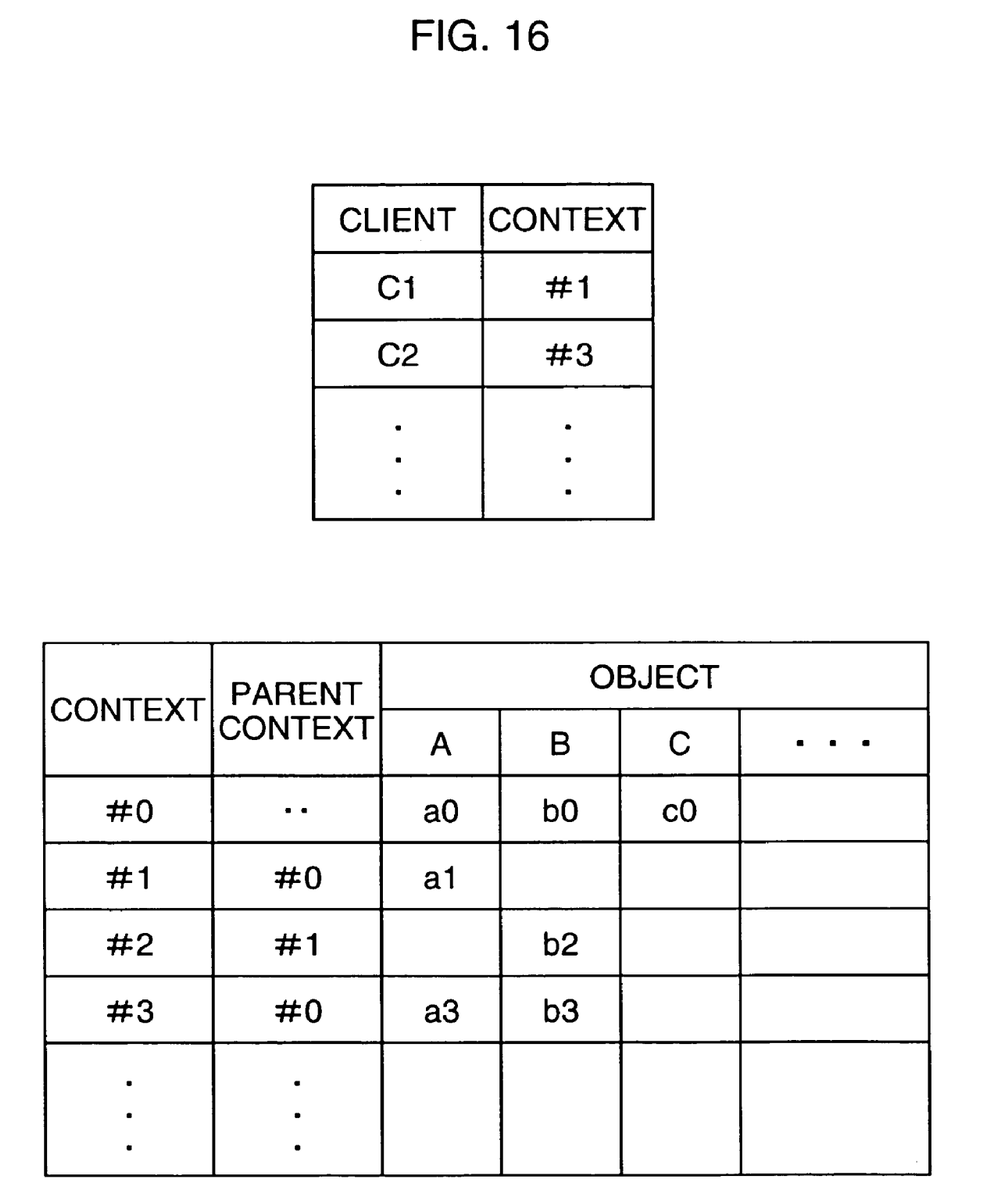
FIG. 16 is a table for explaining another construction example of context management.

In the above embodiment, FIG. 4 shows one table as an example for explaining context management for each client. However, the present invention is not limited to this, and may adopt two separate tables shown in FIG. 16, i.e., a client/context correspondence table representing which context is being used by a client, and a context/entity correspondence table representing a context and a corresponding object entity.

The object of the present invention is realized even by supplying a recording medium storing software program codes for realizing the functions of the host and terminal in the above-described embodiment to a system or apparatus, and causing the computer (or a CPU or MPU) of the system or apparatus to read out and execute the program codes stored in the recording medium.

In this case, the program codes read out from the recording medium realize the functions of the above-described embodiment by themselves, and the recording medium storing the program codes constitutes the present invention.

As the recording medium for supplying the program codes, a ROM, a floppy disk, a hard disk, an optical disk, an optical magnetic disk, a CD-ROM, a CD-R, a magnetic tape, a nonvolatile memory card, or the like can be used.

The functions of the above-described embodiment are realized not only when the readout program codes are executed by the computer but also when the OS running on the computer performs part or all of actual processing on the basis of the instructions of the program codes.

The functions of the above-described embodiment are also realized when the program codes read out from the recording medium are written in the memory of a function expansion board inserted into the computer or a function expansion unit connected to the computer, and the CPU of the function expansion board or function expansion unit performs part or all of actual processing on the basis of the instructions of the program codes.

As has been described above, according to the present invention, a set of object data (context as a "world" made up of a set of object data for a client) subjected to arbitrary processing (trial-and-error calculation, simulation calculation during data write, or the like) executed by each client (e.g., a client who accesses object data) are managed for each client. The relationship between object data constituting a context and entities corresponding to the object data is managed for each context. Further, the parentage (context tree) between contexts managed for respective clients is managed. From these pieces of management information, an entity corresponding to a client who issues an access request is acquired to perform access processing to the entity.

This construction allows respective clients to execute arbitrary processing in parallel with each other as if they accessed their own object data. When, for example, a given client wants to output simulation results (print output, display output, or the like), the client can output the simulation results only by designating output of them (inputting an output command or the like) without any consciousness of a context in use. Since object data and a program for executing arbitrary processing need not be set for each client, the memory can be effectively used, and the apparatus or system configuration can be simplified.

If a context is generated based on a request from a client, arbitrary processing can be executed in various forms.

When an entity to be accessed does not exist (empty), access processing can be done for a parent entity to efficiently manage the entity.

If an entity can be copied between contexts, processing not influenced by the results of arbitrary processing with another context can be executed. In addition, processing from an instantaneous state during arbitrary processing with another context can be executed in a different form.

If contexts can be switched, processing coordinated with arbitrary processing by another client can be executed.

If it is managed whether a child entity is an entity reflecting the results of access to a parent entity (transparent mode) or an entity not reflecting the access results (nontransparent mode), processing can be executed without reflecting arbitrary processing results by another client, or while reflecting arbitrary processing results by another client.

The present invention can efficiently implement, with a simple construction, trial-and-error calculation, simulation calculation during data write, and the like that satisfy the requirements of respective clients.

What is claimed is:

1. A method for accessing object data stored in a database in a computer system for independently processing said object data, comprising:

storing a plurality of contexts in a table,
wherein each of the stored plurality of contexts is a set of data according to given conditions and identified by a context ID,
wherein the stored plurality of contexts comprising an initial context that includes a plurality of entities as copies of initial contents of stored object data and other contexts,
wherein said other contexts are defined by a plurality of users,
wherein said initial context is generated upon a connection request, wherein each of said other contexts includes a set of entities in the plurality of entities and has a parent context;

receiving a request for access to said object data from at least one of the plurality of users;

successively identifying a stored context that corresponds to the received request for access to said object data;

specifying object data corresponding to the received request;

acquiring one or more entities in the set of entities of the identified context, wherein the acquired one or more entities corresponding to the specified object data;

providing content of the acquired entities to the at least one of the plurality of users.

2. The method according to claim 1, wherein the at least one of the plurality of users replaces said set of entities of the identified context with processed data.

3. The method according to claim 1, wherein the set of entities of a successive context in said other contexts has parentage with the set of entities of a preceding context in said other contexts.

4. The method according to claim 3 further comprising:
determining for said request for access whether the acquired entity is an empty entity; and
if the acquired entity is an empty entity, acquiring an entity which has parentage with the acquired entity.

5. The method according to claim 3 further comprising:
determining for said request for access whether the acquired entity is an empty entity; and
if the acquired entity is an empty entity, and said request is accompanied by a write request, copying the contents of an entity parentage of the acquired entity to the acquired entity.

6. The method according to claim 1 further comprising:
copying contents of entities which have been processed in one context to entities of a different context for the specified object data.

7. The method according to claim 1 further comprising:
receiving a request for switching context from at least one of the plurality of users to another context.

8. A computer system for allowing access to object data which is independently processed by a plurality of clients comprising:
an apparatus storing object data;
a plurality of client computer terminals;
a data processing apparatus having a control program for managing stored object data, said control program comprising instructions for:
storing a plurality of contexts in a table,
wherein each of the stored plurality of contexts is a set of data according to given conditions and identified by a context ID,
wherein the stored plurality of contexts comprising an initial context that includes a plurality of entities as copies of initial contents of stored object data and other contexts,
wherein said other contexts are defined by the plurality of client computer terminals,
wherein said initial context is generated upon a connection request,
wherein each of said other contexts includes a set of entities in the plurality of entities and has a parent context;
receiving a request for access to said object data from at least one of the plurality of client computer terminals;
successively identifying a stored context that corresponds to the received request for access to said object data;
specifying object data corresponding to the received request;
acquiring one or more entities in the set of entities of the identified context, wherein the acquired one or more entities corresponding to the specified object data;
providing content of the acquired entities to the at least one of the plurality of client computer terminals.

9. The computer system according to claim 8, wherein said plurality of client computer terminals process additional contexts.

10. The computer system according to claim 8, wherein said plurality of client computer terminals substitute one context for another.

11. The computer system according to claim 10, wherein said control program has additional instructions to:
determine for said request for access if a specified entity exists; and
if said specified entity does not exist, acquiring an entity which has parentage with a previous context of said specified entity for said specified entity.

12. The computer system according to claim 10, wherein said control program has additional instructions to:
determine for said request for access if a specified entity exists; and
if said specified entity does not exist, and said request is accompanied by a write request, copying contents of an entity which has parentage with a previous context of said specified entity for said specified entity.

* * * * *